United States Patent [19]

Andrews et al.

[11] 4,296,676
[45] Oct. 27, 1981

[54] CONTROL MECHANISM

[75] Inventors: David K. Andrews, Cheltenham; Michael W. Smart, Gloucester, both of England

[73] Assignee: Dowty Fuel Systems Limited, Cheltenham, England

[21] Appl. No.: 102,416

[22] Filed: Dec. 11, 1979

[30] Foreign Application Priority Data

Dec. 15, 1978 [GB] United Kingdom ............... 48787/78

[51] Int. Cl.³ .......................................... F15B 13/044
[52] U.S. Cl. ..................................... 91/417 R; 91/459; 137/625.45; 137/625.65; 251/129; 335/276
[58] Field of Search ........................... 91/417 R, 459; 137/625.45, 625.65; 251/129, 133; 335/230, 276

[56] References Cited

U.S. PATENT DOCUMENTS

| | | | |
|---|---|---|---|
| 2,926,696 | 3/1960 | Kolm | 91/459 X |
| 3,149,641 | 9/1964 | Norton | 137/625.65 |
| 3,165,676 | 1/1965 | O'Brien | 335/276 X |
| 3,272,234 | 9/1966 | Parker | 91/459 X |
| 3,938,778 | 2/1976 | Hansen et al. | 251/129 |

FOREIGN PATENT DOCUMENTS 634293 3/1950 United Kingdom .

*Primary Examiner*—Gerald A. Michalsky
*Attorney, Agent, or Firm*—Young & Thompson

[57] ABSTRACT

A mechanism for controlling the position of a movable member and for locking it in any desired position comprising a hydraulic displacement device movable with the member and a slide valve hydraulically connected to the displacement device to control flow of liquid to or from the device. The slide valve includes a preloaded spring, capable in the absence of other force of moving the slide valve to its closed position to lock the member against movement. A force motor is operable when desired to move the slide valve to its open position to permit movement of the member.

9 Claims, 8 Drawing Figures

CONTROL MECHANISM

This invention relates to a mechanism for controlling the position of a movable member. The position of the member may effect some further control with which the present invention is not concerned. For example, the position of the member may control the liquid fuel delivery rate from a variable delivery fuel pump for a gas turbine engine.

It is known in an earlier proposal to provide a hydraulic displacement device, such as a piston and cylinder for a movable member, and to use a valve for opening or closing the displacement device to release the member or to lock the member against movement. In this earlier proposal valve closure is obtained by moving a poppet valve into contact with a seat. This proposal has the disadvantage that the poppet valve will normally meet its seat with an impact and repeated closing of the valve, particularly if the valve operates on the pulse system, will eventually cause valve impact damage which, in turn, will make it impossible for the valve to provide a liquid-tight closure and thus render it impossible for the movable member to be locked in any position. It is also known in this earlier proposal to provide an electro-magnetic force motor, capable when energised, of exerting a force to move the valve to its open position and also to provide a pre-loaded spring strong enough to hold the valve in its closed position when the electro-magnetic force motor exerts no force. A further disadvantage is that the electro-magnetic force motor must be strong enough to provide a force capable of overcoming the pre-load in order to open the valve.

For the purpose of the present specification a pre-loaded spring comprises a spring combined with stop means such that without the application of an external force the spring remains closed with a pre-load force on to the stop means. When an external force is applied to move the spring from the stop means, the external force must exceed the pre-load before spring movement is possible.

The present invention sets out to provide a mechanism for controlling the position of a movable member which avoids one or both of the disadvantages set out above.

In accordance with the present invention a mechanism for controlling the position of a movable member comprises a valve having a closed position and an open position, a hydraulic displacement device secured for movement with the member and a hydraulic connection between the valve and the device such that for the valve closed position the device and member are hydraulically locked against movement and for the valve open position the member and device may move, the valve being formed by a pair of relatively slidable valve components having co-operating valve surfaces, at least one component having a port in its flat surface closable by the other component in the valve closed position, loading means arranged to hold the components with their flat surfaces in sliding contact, a pre-loaded spring acting between the components in a direction parallel to the flat surfaces so that the spring pre-load on its own may move the components to the valve closed position and a force motor capable when energised of exerting a force to move one component relative to the other against the pre-load of the spring towards the valve open position.

The force motor may be an electro-magnetic force motor energisable by an electric signal.

The displacement device may comprise or form part of an hydraulic motor, and the valve, when in the open position, may permit flow of liquid under pressure into the displacement device to cause it to operate as a motor.

The valve components may be relatively movable in either of two directions from the closed position to open either of two ports in the component flat surfaces to provide two alternative open positions, the displacement device may be a double-acting motor, and a pair of hydraulic connections may carry hydraulic liquid to or from the displacement device under the control of the valve, the valve in its closed position ensuring closure of at least one of said connections.

Two embodiments of the invention will now be described with reference to the accompanying drawings, in which.

Figure 1:
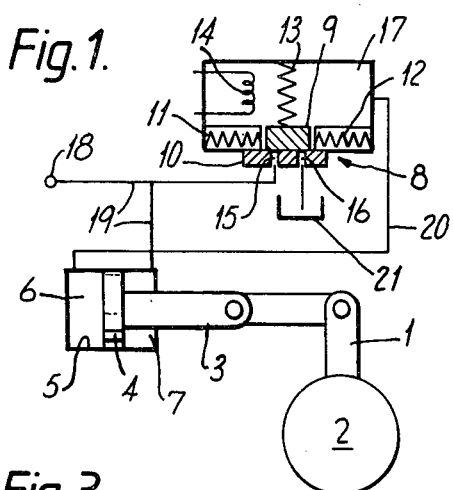
FIG. 1 is a diagrammatic illustration of the valve and hydraulic displacement device applicable to both embodiments of the invention.

In FIG. 1 the movable member is the displacement varying lever 1 of a liquid fuel pump 2 for a gas turbine engine. The member 1 is connected to the piston rod 3 of an hydraulic displacement device formed as a double acting differential area piston 4 and cylinder 5. A working space 6 of large cross-sectional area is formed on the left-hand side of piston 4 within cylinder 5, whilst a working space 7 of smaller cross-sectional area is formed on the right-hand side of piston 4 around piston rod 3 within cylinder 5.

The valve 8 is diagrammatically shown in FIG. 1 as a moving valve component 9 and a fixed valve component 10 pre-loaded into a valve closed position by means of a pair of springs 11 and 12 which together with suitable stops form a pre-loaded spring. The valve components are urged together by means of a spring 13. An electro-magnetic force motor indicated at 14 by its energising coil is capable, when energised, of moving the valve component 9 against the pre-load of the springs 11, 12.

Two ports 15 and 16 open to the flat surface of valve component 10 into the interior of a chamber 17, one or the other or both of these ports being normally closed depending on the position of the moving valve component 9. Port 15 is connected to a source 18 of liquid at high pressure by a connection 19 and port 16 is connected to drain 21. Chamber 17 is connected to working space 6 by connection 20 and the working space 7 is connected to the source 18 by connection 19.

If valve component 9 is moved to the right, port 15 opens to chamber 17 and liquid at pressure passes to the working space 6. Within the cylinder 5 liquid at pressure acts in both working spaces 6 and 7 and since space 5 has the larger cross-sectional area piston 4 is thereby urged to the right. If the valve component 9 is moved to the left, chamber 17 and working space 6 are connected to drain and pressure in working space 7 will then be able to move piston 4 to the left. When valve component 9 is in its central closed position the working space 6 is closed and pressure in the working space 7 will urge piston 4 to compress liquid in working space 6 and thus hold the piston 4 in a fixed position.

Figure 2:
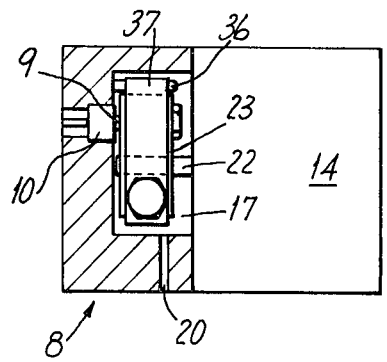
FIG. 2 is a general arrangement of the valve and force motor of the first embodiment, partially in cross-section.

Reference is now made to FIG. 2, showing the first embodiment of the invention. In this instance the electro-magnetic motor is an electric torque motor in which an electric signal will rotate an output shaft 22 in one direction or the other through a small angle. The direction of rotation will depend on the direction of the electric signal supplied. The moving valve component 9 is carried by an arm 23 secured to shaft 22, the torque exerted by shaft 22 becoming a force as exerted at valve component 9.

Figure 3:
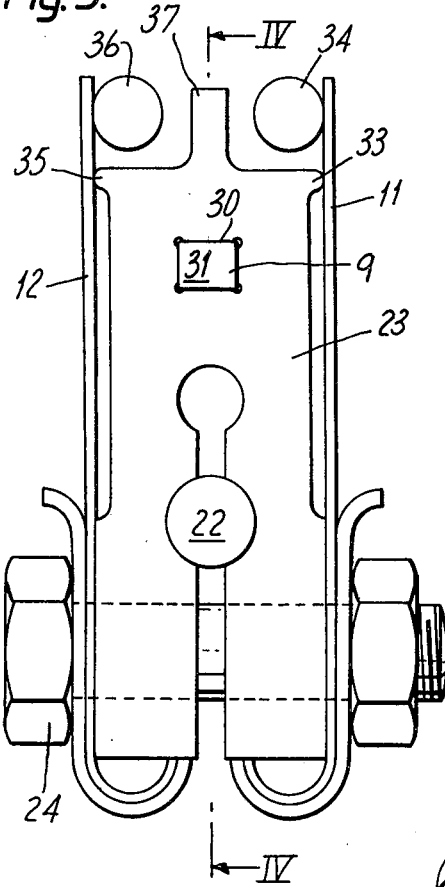
FIG. 3 is an elevation of one valve component and the pre-loaded spring mechanism of the first embodiment to an enlarged scale.
Figure 4:
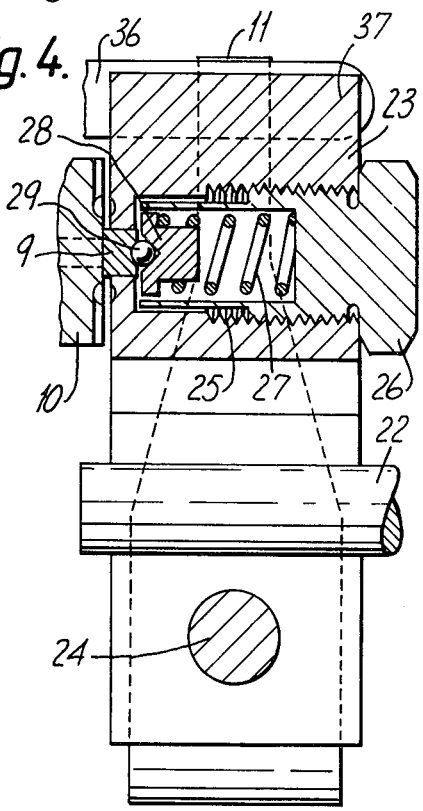
FIG. 4 is a cross-section on the line IV—IV on FIG. 3.

Reference is now made to FIGS. 3 and 4 to describe the valve in more detail. The arm 23 is slotted and provided with a clamp bolt 24 whereby the arm is fixedly secured on to the shaft 22. At a distance from shaft 22 arm 23 has a screw-threaded bore 25 which receives a plug 26 enclosing a compression spring 27. The spring 27 acts through an end cap 28 and ball 29 on to the moving valve component 9. This latter is a block of tungsten carbide of rectangular form mounted in a rectangular hole 30 formed in one side surface of the arm 23. The action of spring 27 is to press valve component 9 outwardly from hole 30. The outer surface 31 of valve component 9 is flat and unported. The shaft 22 is arranged to pass through the centre of gravity of arm 23.

The fixed valve component 10 is also of tungsten carbide and is secured in the wall of chamber 17 so that a flat valve surface 32 thereof (see FIG. 5) faces valve component 9 and engages valve surface 31. The valve component 10 is provided with the two ports 15 and 16 which open into surface 32 at closely spaced positions so that they may be covered simultaneously by valve surface 31 when in its central position (as shown in dotted lines in FIG. 5). The chamber 17 is connected by connection 20 in the wall of chamber 17 to the working space 6 of FIG. 1. It will be clear that the loading of spring 27, as seen in FIG. 4, will hold valve component 9 on to valve component 10, the slight looseness of securing the valve component 9 in hole 30 enabling the valve component 9 to settle so that its flat surface 31 fits very closely on to valve surface 32.

The two springs 11 and 12 of FIG. 1 take the form of leaf springs 11 and 12 of FIGS. 3 and 4. These leaf springs are clamped by bolt 24 to opposite sides of the arm 23, the leaf spring 11 making contact with a moving stop 33 on arm 23 and the leaf spring 12 making contact with a moving stop 35 on arm 23. Each leaf spring 11 and 12 in its free state would take up a curved form but when clamped in position by bolt 24 to engage its moving stop will become substantially straight and will exert an elastic pre-load force on its stop. With this arrangement if an anti-clockwise torque is exerted by shaft 22 as seen in FIG. 3 the movement of arm 23 will cause spring 11 to engage a fixed stop formed by pin 34 secured to the wall of chamber 17 and, assuming that the torque is sufficient to overcome the load of spring 11, the arm 23 will move anti-clockwise so that stop 33 moves away from spring 11 and valve component 9 moves over valve component 10 to open port 16. If the arm 23 is moved in the clockwise sense leaf spring 12 will engage a fixed stop formed by pin 36 whereby stop 35 will move away from spring 12 when the torque exerted by arm 23 overcomes the spring load. In such movement the moving valve component 9 will move over fixed valve component 10 to open port 15. The leaf springs 11 and 12 and stops 33, 34, 35 and 36 together form a pre-loaded spring.

A third moving stop 37 is formed on the arm 23 to extend between the fixed stops 34 and 36. For either direction of moving of arm 23 one or other of the stops 34 and 36 will form a limit of angular movement. In the central position of the arm 23 when no torque is exerted by motor 15, both springs 11 and 12 engage on the moving stops 33 and 35 and on the fixed stops 34 and 36 holding the valve component 9 so that its surface 31 completely closes the ports 15 and 16.

Movement of the arm 23 in one direction or the other depends on the direction of electric current fed to the torque motor. Actual movement of the arm 23 will depend on the current fed to the torque motor exceeding a certain minimum value capable of generating a force to overcome spring pre-load. The opening of port 15 or port 16 will cause movement of piston rod 3 and piston 4 substantially as described with reference to FIG. 1. Preferably the current fed to the torque motor will always be sufficient to generate a force to move the arm 23 so that stop 37 will engage one or the other fixed stop 34 or 36.

In this first embodiment the hydraulic displacement device is formed by piston 4, cylinder 5 and the working spaces 6 and 7, and the closure of the valve formed by valve components 9 and 10 will ensure that no flow is permitted in either direction between valve chamber 17 and working space 6 through the connection 20, thus locking piston rod 3 and member 1 against movement.

Figure 5:
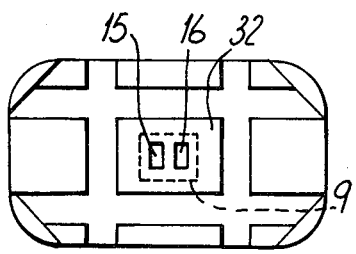
FIG. 5 is a surface view of the fixed valve component on FIGS. 2 and 4.
Figure 6:
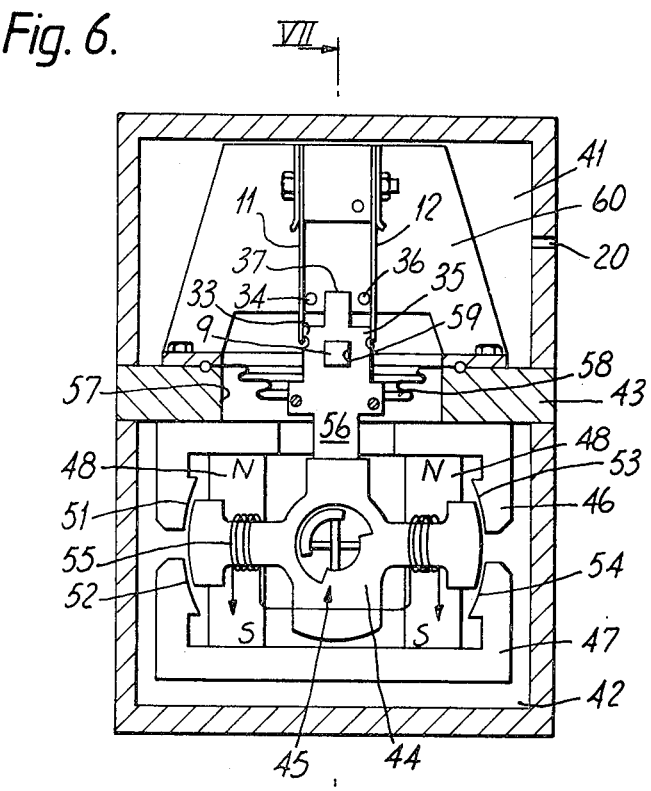
FIG. 6 is a diagrammatic cross-sectional view of the valve and force motor of the second embodiment.
Figure 7:
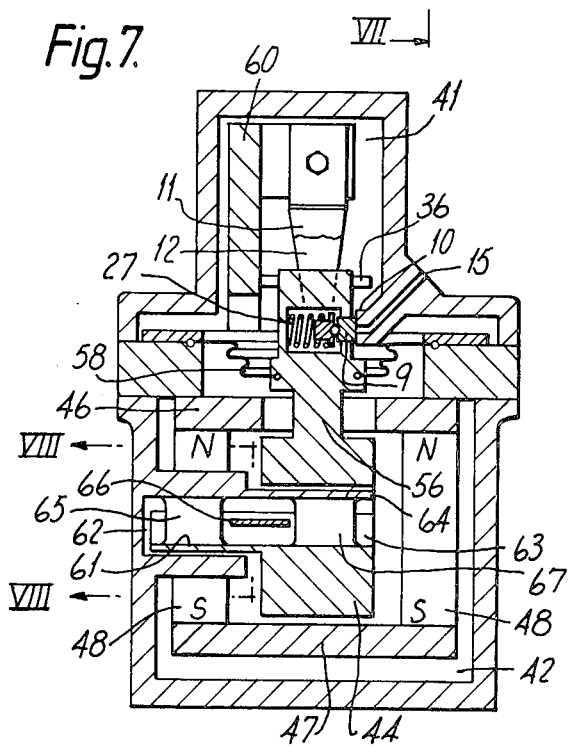
FIG. 7 is a cross-section on the line VII—VII on FIG. 6, and, FIG. 8 is a cross-section on the line VIII—VIII on FIG. 7.
Figure 8:
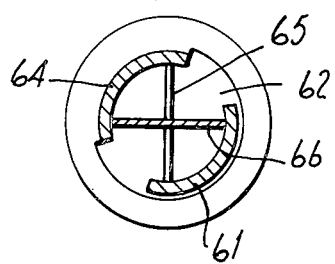

Reference is now made to the second embodiment of the invention shown in FIGS. 6, 7 and 8. Reference numerals similar to those used in FIGS. 2 to 5 will refer to similar parts in FIGS. 6 to 8. The force motor and the valve are formed as one unit in which two chambers 41 and 42 are formed by covers secured to opposite sides of a central wall 43. The electric force motor is located in chamber 42 and comprises an armature 44 centrally pivoted by a resilient pivot 45 and movable relatively to a pair of fixed soft iron pole pieces 46 and 47 magnetised by permanent magnets 48 to have magnetic north and south polarities. the pole pieces provide a pair of pole faces 51 and 52 at one end of the armature and a second pair of adjacent pole faces 53 and 54 at the opposite end of the armature.

The armature carries a single winding 55 connected by any convenient manner to receive electric controlling signals. An arm 56 extends from the centre of the armature at right angles to the length thereof through a hole 57 in wall 43 in the chamber 41, a flexible diaphragm 58 serving to isolate a quantity of inert liquid in chamber 42. Within chamber 41 arm 56 has a rectangular hole 59 to carry a moving valve component 9 and a loading spring 27. The fixed valve component 10 cooperating with component 9 is fixed to the wall of chamber 41 and includes the ports 15 and 16 as shown by FIG. 5.

A bracket 60 is mounted on wall 43 in chamber 41 and carries the pre-loaded spring comprising a pair of leaf springs 11 and 12 normally curved but engageable with fixed stops 34 and 36 with pre-load to be held in the straight condition as seen in FIG. 6. The springs are also engageable on a pair of moving stops 33 and 35 formed on the end of arm 56 remote from pivot 45. A further moving stop 37 carried by arm 56 lies between the fixed stops 34 and 36.

The pivot 45 is intended to provide the armature 44 with limited angular movement without friction. For this purpose the armature has a part-cylindrical extension 61 extending into a bore 62 into the wall of chamber 42 and another part-cylindrical extension 64 from the wall extends into a bore 63 in the armature. Three resilient strips 65, 66 and 67 effectively act between the armature 44 and the wall of chamber 42, these strips being actually connected to the bores 62 and 63 and extensions 61 and 64. Strip 65 is connected between extension 61 and bore 62, strip 66 is connected between extensions 61 and 64 and strip 67 is connected between extension 64 and bore 67. Strips 65 and 67 lie in one plane and strip 66 lies in between strips 65 and 67 in a plane at right-angles thereto. The strips hold the armature against movement other than pivotal movement about an axis passing through bores 62 and 63. Such pivotal movement of the armature is permitted by flexing of the strips and the setting of the strips is preferably such that they are not resiliently bent when the arm 56 lies in the valve closed position of FIG. 6. Also it is arranged that the effective pivotal axis passes through the centre of gravity of the armature and the arm to reduce sensitivity of the valve to linear accelerations.

The force motor and valve of FIGS. 6 to 8 are connected into the circuit of FIG. 1 for use. The armature 44 is deflectable into the clockwise or anti-clockwise direction from the FIG. 6 position, depending on the direction of electric current fed to winding 55. The magnitude of the current is preferably always sufficient to cause deflection of arm 56 against the pre-load of the spring strips 11 and 12 and such that the moving stops 37 will engage one or other fixed stop 34 or 36. For clockwise movement as seen in FIG. 6, arm stop 35 engages spring 12 to move it from fixed stop 36 whilst spring 11 is held by fixed stop 34. For anti-clockwise movement as seen in FIG. 6, arm stop 33 engages spring 11 to move it from fixed stop 34 whilst spring 4 is held by fixed stop 36. Clockwise movement of arm 56 opens port 15 to chamber 41 and anti-clockwise movement opens port 16 to chamber 41 giving movement to the moving member 1 as described with reference to FIG. 1. For the central position of arm 56 and valve component 9 as shown in FIG. 6 ports 15 and 16 are closed, thus locking the moving member 1 as described with reference to FIG. 1. For FIG. 6 it will be appreciated that any tendency of moving member 1 to move when valve component 9 is in the closed position will cause generation of hydraulic pressure in volume 6 of cylinder 5 which is communicated by connection 20 to chamber 41. The hydraulic liquid filling chamber 41, connection 20 and working space 6 and the inert liquid in the force motor will ensure that no movement is possible for the moving member 1 since such liquid effectively forms a hydraulic lock.

In the two described embodiments the piston 4 and cylinder 5 together form a hydraulic motor for moving the movable member 1 in addition to performing the function of a displacement device capable of locking member 1. However, it is within the scope of the present invention for the means which actually moves the moving member to be separate from the hydraulic displacement device except in so far that the means for moving the member and the mechanical displacement device are both connected to the member. Thus the invention may provide a lock which will prevent movement of the movable member other than when the valve is opened.

Whilst in each described embodiment the hydraulic displacement device is double acting in the sense that it controls movement of the movable member in two directions it is also within the scope of the present invention to provide an arrangement for controlling movement of the movable member in one direction only.

This invention and in particular the two illustrated embodiments are well suited for operation by an electrical pulse system in which the accurate position of the moving member is controlled by a series of electrical pulses, the spacing and direction of the pulses determining the permitted movement of the movable member rather than the magnitude of the electric current in each pulse provided that the magnitude of the current is sufficient to move the movable valve component to a fully-open position for each pulse. Thus control of the position of the moving member is determined on the digital principle rather than the analog principle.

The main advantage arising from this invention is that valve operation involves no impact between valve components, thus resulting in long life for the valve, particularly when operated on the electrical pulse system. Further advantages are as follows:

(a) Any wear which results at the flat valve surfaces will be compensated by virtue of the load which holds the two valve components in contact with one another.

(b) Since the pre-loaded spring is not required to hold one valve component seated against the other, the pre-loading forces of the pre-loading spring may be quite small, thus enabling the force motor to overcome the spring pre-load by exerting a comparatively small effort. Thus the force motor may be comparatively small and the power that it consumes may be accordingly small.

(c) By making both valve components of very hard wear-resisting material, such as tungsten carbide, the valve will then have a very long working life.

(d) By arranging the moving valve component on a balanced angularly moving arm the possibility of accidental valve operation by linear acceleration of the whole valve will be reduced.

We claim:

1. A mechanism for controlling the position of a movable member comprising a valve having a closed position and an open position, a hydraulic displacement device secured for movement with the member and a hydraulic connection between the valve and the device such that for the valve-closed position the device and member are hydraulically locked against movement and for the valve-open position the member and device may move, the valve being formed by a pair of relatively-slidable valve components having co-operating flat surfaces, one of said components being slidably carried in and projecting outwardly from an aperture formed in a pivotally mounted arm and the other being fixed so that angular movement of the arm causes sliding movement of the one component over the fixed component, at least one of said components having at least one port in its flat surface closable by the other of said components in the valve-closed position, loading means housed within said arm and bearing on said one component to urge it in a direction outwardly of said arm and thereby hold its flat surface in sliding sealing engagement with the co-operating flat surface of said fixed component, a pre-loaded spring assembly comprising a pair of stops carried by said arm, a pair of leaf springs mounted to press oppositely with pre-load on said arm stops, and a pair of fixed stops adapted to contact the leaf springs at positions adjacent said arm stops, said leaf springs thereby acting between said components in a direction parallel to said co-operating flat surfaces so that the spring pre-load on its own may move said components to the valve-closed position, and a force motor which is capable, when energised, of exerting a force to move one said component relative to the other against the pre-load of the spring assembly towards the valve-open position.

2. A mechanism as claimed in claim 1, wherein the force motor is an electro-magnetic force motor energisable by an electric signal.

3. A mechanism as claimed in claim 1, wherein the displacement device comprises or forms part of an hydraulic motor, and the valve, when in the open position, permits the flow of liquid under pressure into the displacement device to cause it to operate as a motor.

4. A mechanism as claimed in claim 3, in which the valve components are relatively movable in either of two directions from the closed position to open either of two ports in the component flat surfaces to provide two alternative open positions, the displacement device is a double-acting motor, and a pair of hydraulic connections carry hydraulic liquid to or from the displacement device under the control of the valve, the valve in its closed position ensuring closure of at least one of said connections.

5. A mechanism as claimed in claim 4, wherein the displacement device comprises a differential area double-acting piston-and-cylinder unit, a source of liquid at high pressure being connected to the working volume of smaller area and the working volume of larger area being connected by the connection to the valve which is arranged in one open position to connect the connection to the high pressure source, in the other open position to connect the connection to a low pressure zone and in the closed position to close the connection.

6. A mechanism as claimed in claim 5, including a valve chamber connected to said hydraulic connection, one valve component fixed to the wall of the chamber and two ports opening to the flat surface of the fixed component, the moving valve component being within the chamber so that in one valve open position one port is connected to the chamber and in the other valve open position the other port is connected to the chamber.

7. A mechanism as claimed in claim 6, including a force motor chamber secured to the valve chamber, an angularly movable arm extending from the force motor in the force motor chamber into the valve chamber to support the moving valve component against the fixed valve component, a seal isolating the valve chamber from the force motor chamber and a inert liquid filling said force motor chamber to ensure little or no distortion of said seal on occurrence of pressure in said chamber.

8. A mechanism as claimed in claim 1, wherein the pivotally mounted arm is carried by an angularly resilient pivot.

9. A mechanism as claimed in claim 8, wherein the angularly resilient pivot comprises a plurality of flexible strips each mounting and locating the arm and arranged to bend resiliently during angular movement of the arm.

* * * * *